United States Patent [19]
Krenson

[11] Patent Number: 4,779,373
[45] Date of Patent: Oct. 25, 1988

[54] TRAP ASSEMBLY FOR BIRDS

[76] Inventor: Claude A. Krenson, 1274 NW. 79th St., #F612, Miami, Fla. 33147

[21] Appl. No.: 93,932

[22] Filed: Sep. 8, 1987

[51] Int. Cl.$^4$ ............................................. A01K 69/10
[52] U.S. Cl. ............................................ 43/66; 43/61
[58] Field of Search ................................ 43/66, 60, 61

[56] References Cited

U.S. PATENT DOCUMENTS

| | | | |
|---|---|---|---|
| 366,802 | 7/1887 | White | 43/66 |
| 383,700 | 5/1888 | Brusie | 43/66 |
| 892,756 | 7/1908 | Morris | 43/66 |
| 1,363,626 | 12/1920 | Thomas | 43/66 |
| 1,911,919 | 5/1933 | Molls | 43/66 |
| 2,178,789 | 11/1939 | Heath | 43/66 |
| 3,393,468 | 7/1968 | Wood | 43/66 |
| 3,672,090 | 6/1972 | Sonntag | 43/66 |

Primary Examiner—Gene P. Crosby
Attorney, Agent, or Firm—John Cyril Malloy

[57] ABSTRACT

A trap assembly designed to catch and maintain birds, preferably pigeons, within a storage space of the trap assembly without injuring or harming the birds during the trapping or storing procedure. A closure and entrance of the assembly are cooperatively structured to allow passage of a bird through the entrance and into engagement with the closure element which will be displaced upon such engagement into a non-covering relation to the entrance allowing the bird to pass therethrough but preventing any bird collected within the storage space to exit the entrance thereof.

14 Claims, 2 Drawing Sheets

TRAP ASSEMBLY FOR BIRDS

BACKGROUND OF THE INVENTION

1. Field of the Invention

This invention is directed to a bird trap specifically for the trapping and collecting of a plurality of birds of the grouse type and specifically pigeons but also including quails, doves, pheasants, grouse, etc. wherein such birds are characterized by eating from a supporting surface with their heads lowered during forward movement of the bird. The trap assembly is structured to take advantage of this orientation in order to facilitate entrance of the bird into the storage area of the trap and prevent escape therefrom.

2. Description of the Prior Art

In almost all areas of the United States as well as many other areas of the world, pigeons are found, not only in the wild, but in metropolitan areas. The large quantity of pigeons which inhabit certain metropolitan areas has resulted in a problem necessitating the removal thereof. Such removal is considered necessary not only because of a nuisance factor but also because there is a health hazard present. Cryptococcus is an infectious disease derived from a pathogenic fungi that grows in pigeon droppings which can cause the above noted disease. This disease affects the lungs and other organs in the body and can even be fatal. Other diseases associated with pigeons include encephalitis and hepatitis as well as salmonella and dyptheria. Expensive devices to repel the pigeons from buildings or the like have resulted in complex and frequently dangerous electronic devices, sound systems, etc. which are both expensive and of questionable reliability. Traps of course exist in many structural configurations designed to trap birds of numerous varieties as well as other type of animals. Typically, such traps are designed for the particular species which they are intended to capture and such traps frequently are designed not only to capture the animals but frequently harm and destroy such animals. Trap structures of a variety of structures, designs and configurations are represented in the following U.S. Pat. Nos. to Barker, 1,262,160; Evans, 1,029,053; Clapp, 1,234,629; Smith, 1,495,116; Boyer, 1,506,045; Sonntag, 3,672,090; Beisel, 1,335,359; Thomas, 1,363,626; Clapp, 1,371,070; Sosbee, 1,497,883; and Llanos, 4,603,504.

While the trap structures disclosed in the above noted patents are considered to be operable for their intended function, none are specifically structured for the capturing of pigeons or like birds demonstrating similar characteristics of the pigeon in an efficient manner which allows for the "storage" of a plurality of pigeons within a storage area without doing harm to the pigeon and further wherein the captured pigeons may be released or utilized in a more humane manner other than harming or killing the pigeons.

SUMMARY OF THE INVENTION

There is an increasing need, particularly in metropolitan areas, for the capturing and removal of birds, particularly pigeons, from nesting or flocking areas such as the areas on or surrounding a given building or the like. The collection of pigeons is not only an inconvenience but in some instances may do damage due to the defacing of buildings by the waste materials left by the flocking or roosting of the pigeons.

Pigeons and similar grouse like birds do have one common characteristic which the trap assembly of the present invention is designed to take advantage of and thereby render more efficient the trapping and collection of such birds. This characteristic is the body orientation of maintaining the head in a lowered position when the pigeon is eating and simultaneously moving forward. Such orientation specifically is maintained when the pigeon is following a trail of food and simultaneously walking in a forward direction while eating such "trail".

Accordingly, the trap assembly of the present invention comprises a housing which incorporates an entrance formed in the wall portion of the housing and covered by a closure means. The closure means is displaceable between a normally covering position relative to the entrance and a non-covering position relative thereto by cooperative engagement with the bird as he passes through the entrance into a storage area of the housing while in the aforementioned head lowered position. The bird is coaxed into maintaining this head lowered position by providing a trail of food material leading from the exterior of the housing through the entrance into the storage area. Without noticing his location, the bird will walk forwardly through the entrance and allow a closure element of the closure means to engage the bird, pass over his shoulders and above his head thereby automatically positioning itself into a non-covering relation. This allows the passage of the bird through the entrance into the storage area. Once the closure element becomes disengaged from the shoulder and back area of the bird, it will then automatically fall into its covering position, due to gravity, and be maintained in such covering position by a retaining means. The retaining means is also associated with the closure element of the trap assembly of the present invention.

The closure element is further structured to prevent the captured birds, once in the storage area, from exiting the housing of the trap assembly by passing back through the entrance since the closure element cannot be effectively opened, by the bird, from the interior or storage space of the housing of the trap assembly.

The referred to housing of the trap assembly is preferably made from an open wire mesh material including a plurality of apertures which are relatively large but of sufficient dimension to prevent exiting of the birds, of the size of an adult pigeon, through the apertures of the open mesh material. Yet, the open mesh material gives the bird the impression of a generally open space and allows the bird to be maintained within the storage space without an enclosed "feeling" thereby allowing the "quiet" collection of a plurality of birds without harm or injury being done.

More specifically, the housing includes a roof portion and wall portion wherein the roof portion is disposed in overlying relation to the storage space and the wall portion is disposed in laterally surrounding relation to the storage space and connected at its upper periphery to the roof portion.

A support means is secured to the lower periphery of the wall portion and extends outwardly from the plane of the wall portion inwardly towards the storage space to define a support flange. The support flange has a sufficient transverse dimension to extend inwardly into the interior of the housing an amount which allows the bird to effectively stand or be positioned on the flange itself thereby rendering it impossible for the bird to "crawl" underneath the wall portion.

Also, the storage space and housing includes an open flooring which enables the storage space to be exposed directly to the supporting surface on which the housing is mounted. Similarly, the entrance has an open floor communicating directly with the storage space and the open flooring thereof such that the bird, when passing through the entrance does not have to walk onto any type of flooring or platform which would have tendency to disuade the bird from passing completely into the storage space through the entrance.

The invention accordingly comprises the features of construction, combination of elements and arrangement of parts which will be exemplified in the construction hereinafter set forth and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
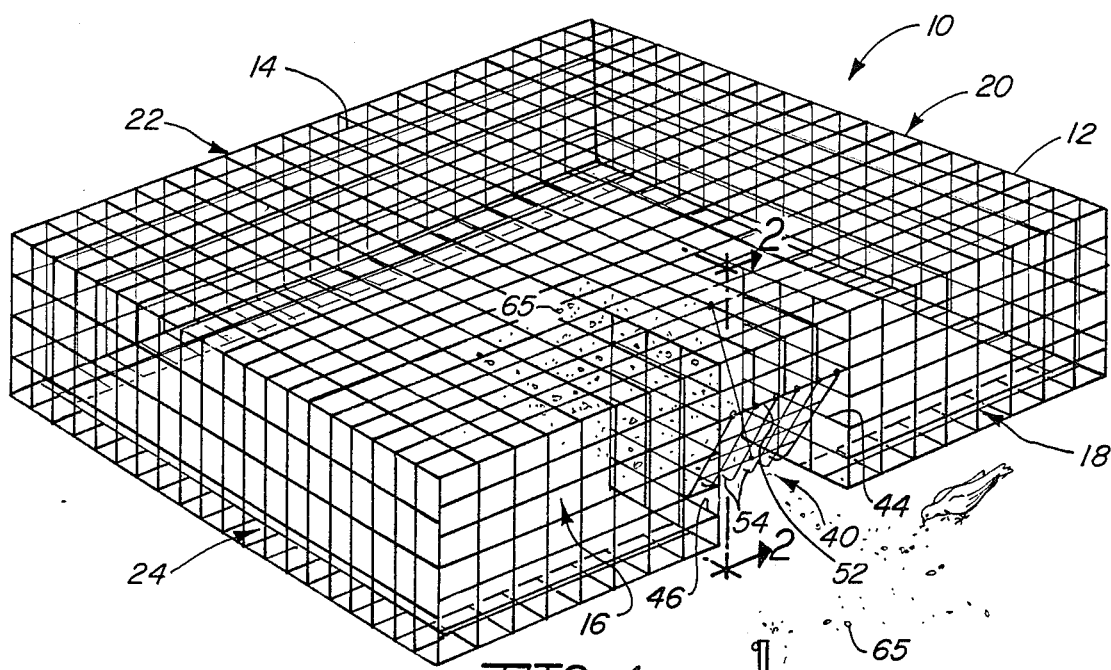
FIG. 1 is a perspective view of the trap assembly of the present invention.

As shown in FIG. 1, the trap assembly of the present invention is generally indicated as 10 and comprises a housing 12 having a roof portion 14 overlying a substantially centrally disposed storage area 16 wherein the storage area 16 is surrounded by a wall portion comprising a plurality of wall segments generally indicated as 18, 20, 22 and 24. As shown in FIG. 1 and as aptly demonstrated in other figures herein, the roof structure 14 is secured integrally to an upper periphery of the various wall segments 18, 20, 22 and 24 and extends over the entire storage area 16 to provide the upper boundaries thereof. The wall segments 18 through 24 are shown in a multi-sided substantially continuous configuration. However, it should be noted that the specific configuration of the wall segments may collectively vary and not necessarily be disposed into a rectangular configuration as pictured in FIG. 1.

Also, the roof section 14 and the wall portion comprising the plurality of wall segments are each formed from an open mesh, preferably wire material, including an apertured construction defined by a plurality of immediately adjacent apertures. The size of the apertures are such as to provide an open free feeling for birds even when maintained within the storage area 16 but the dimensions of the individual apertures are such as to prevent passage therethrough of a bird the size of an ordinary adult pigeon.

Figure 8:
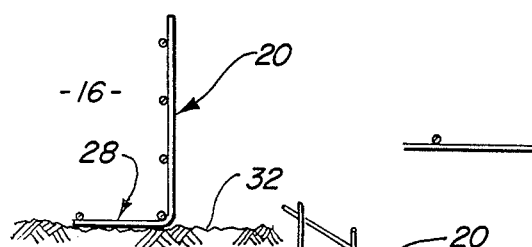
FIG. 8 is a sectional view along line 8—8 of FIG. 7.
Figure 7:
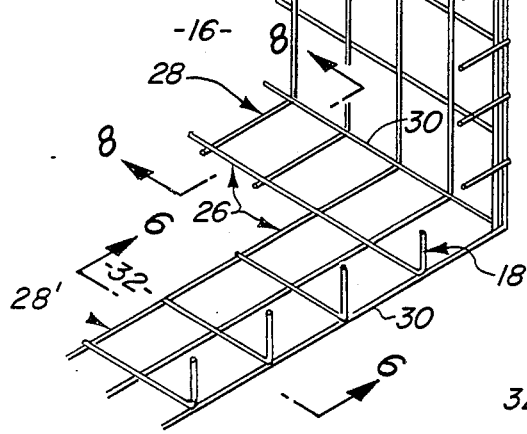
FIG. 7 is a perspective view in partial cutaway showing the structural details of the support of the housing on a supporting surface.
Figure 6:
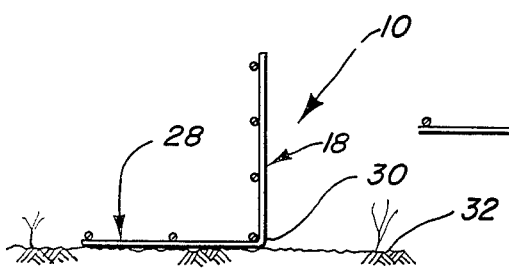
FIG. 6 is a sectional view along line 6—6 of FIG. 7.
Figure 5:
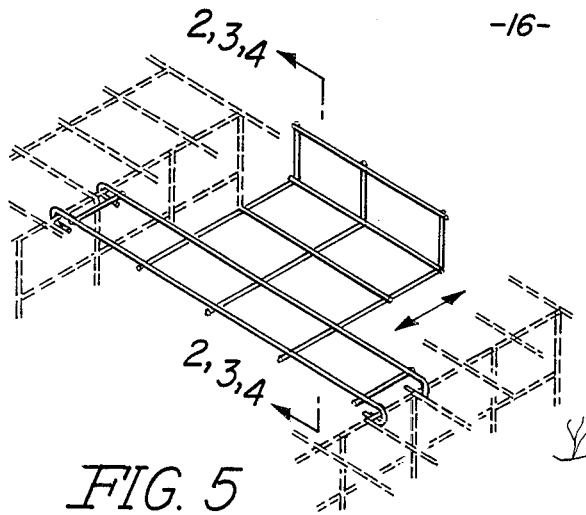
FIG. 5 is a perspective view in partial cutaway and phantom lines showing operative structural details of a retaining structure for the closure element of the present invention.

Other structural features of the subject housing 12 include a support means (see FIGS. 6, 7 and 8) generally indicated as 26 and including a flange 28 secured to the lower periphery of the individual wall segments as at 30 by an integral or otherwise fixed construction. The flange 28 extends preferably continuously along the length of the individual wall segments in surrounding relation to the storage area 16 and inwardly into the interior of the storage area from the respective wall segments 18, 20, 22 and 24. Further, the transverse dimension, as clearly shown in FIGS. 6, 7 and 8 is such as to allow a bird, the size of a pigeon, to stand on the support flange 28 thereby rendering it impossible to crawl or dig underneath the support flange in an attempt to exit from the storage space in this manner. As shown in FIG. 7, each of the flanges 28 and 28' are considered to be of common transverse dimension along their entire length and, as set forth above, this transverse dimension is such as to allow a bird to be supported thereon. Further, the flange 28 is also formed from the above noted open mesh material and therefore has sufficient flexibility, strength and rigidity to maintain an adequate support of the housing 10 on a support surface such as the ground or the like 32 while being able to adapt to any inconsistencies in the normally flat configuration of the supporting surface 32 as at 34.

With regard to FIGS. 1 and 7, it should be noted that the housing 12 as well as the storage area 16 is further structured to include an open flooring such that the storage space 16 is exposed directly to the supporting surface 32. This eliminates the necessity of the bird from walking onto any support platform or artificial flooring when entering the storage area which would have a tendency to disuade the bird from entering through the entrance generally indicated as 40 in FIGS. 1 and 2. The entrance 40 also has an open floor area 32' such that as the bird 42 walks continuously in a straight ahead direction, he will pass through the entrance 40 over the open floor 32' of the entrance and into the storage area and directly onto the supporting surface 32 due to the open flooring construction as set forth above without having to step onto any artificial flooring.

Figure 2:
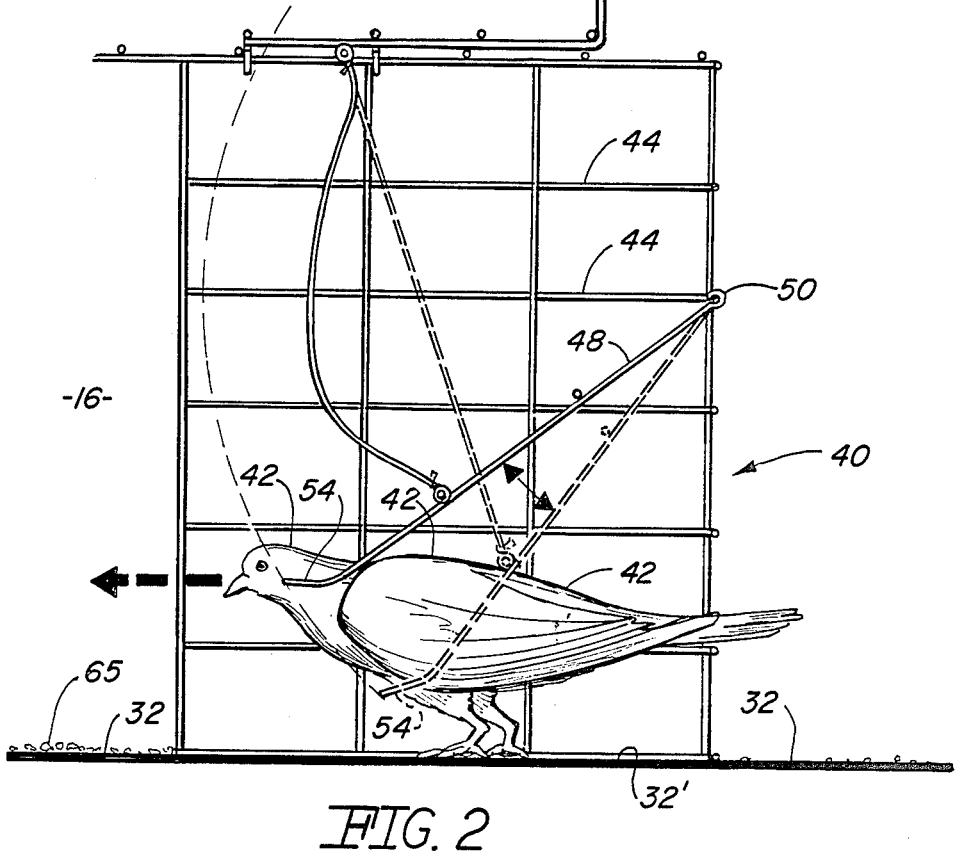
FIG. 2 is a sectional view in partial cutaway along line 2—2 of FIG. 1 with a bird passing through the entrance of the subject trap assembly into a storage space on the interior thereof.

The entrance 40 comprises an opening in the wall segment 18 defined by side walls 44 and 46 extending transversely into the interior of the storage space 16 relative to the wall segment 18 in which they are formed or to which they are connected. These side walls 44 and 46 are disposed in cooperative relation to the closure means shown more specifically in FIGS. 3 and 4 which includes a closure element 48. As will be explained with regard to the operation of the closure element 48, the disposition and dimension of the side walls 44 and 46 prevents any previously captured bird from exiting through the entrance 40 while another bird 42 is passing into the storage means from the exterior thereof as shown in FIG. 2. The length of the closure element 48 is such as to never pass beyond the transverse dimension of the side walls 44 and 46 as pictured in FIGS. 2, 3 and 4. Also, although not clearly shown, side walls 44 and 46 may also include a supporting flange 28 secured to the lower periphery thereof and extending transversely outwardly therefrom wherein such flange 28 is part of the support means generally referred to in FIG. 7 as 26.

The closure means includes the closure element 48 pivotally connected as at 50 at one end thereof to an outer portion of the entrance 40 and more specifically to a support wire or the like 52. The free end of the closure element 48 comprises a plurality of finger elements 54 maintained in spaced relation to the supporting surface 32 (or 32') as clearly shown in FIG. 4 wherein the closure element 48 is represented in solid lines in its covering position relative to the entrance 40. A retaining means includes a connector element 56 having opposite ends connected to the closure element 48 and the roof portion 14 of the housing in interconnecting relation therebetween such that the length of the connector element 56 is such as to prevent the free end and plurality of fingers 54 of the closure element 48 from coming into contact with the supporting surface 32. Further, the finger elements (see FIGS. 1 through 4) extend angularly inwardly towards the interior of the storage space 16 in interruptive position relative to any bird attempting to exit through the entrance 40 from the storage space 16.

Figure 3:
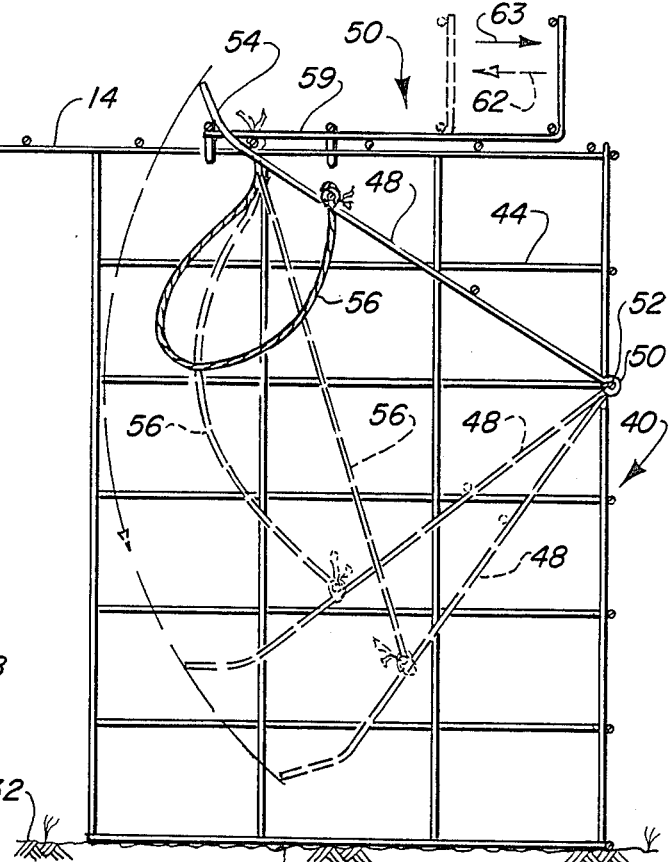
FIG. 3 is a sectional view in partial cutaway along line 3—3 of FIG. 5 with a closure element of the present invention in a non-covering position relative to the entrance represented in solid lines and the covering element in a covering position relative to the entrance represented in phantom lines.
Figure 4:
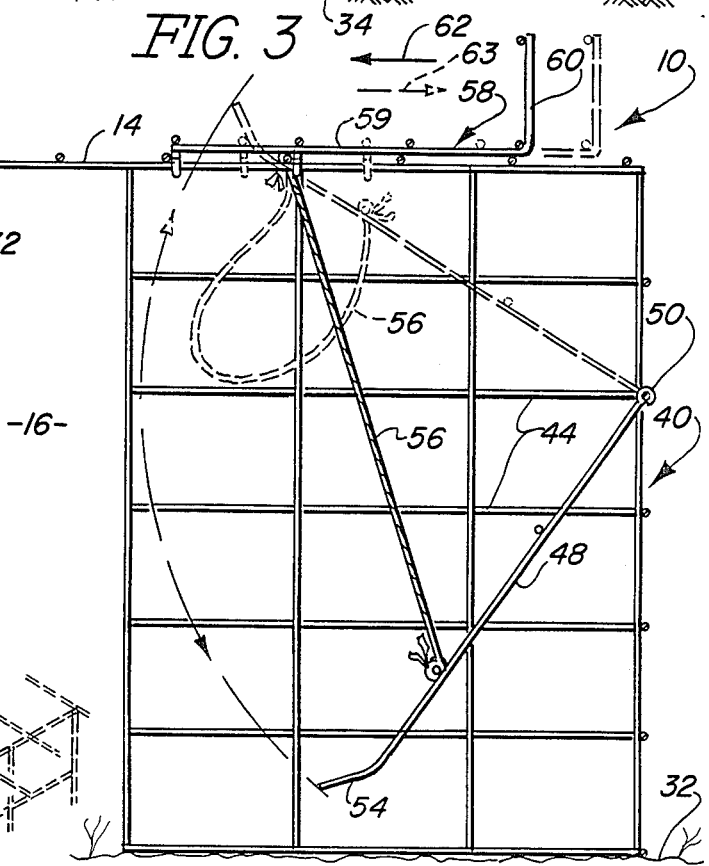
FIG. 4 is a sectional view in partial cutaway of the closure element of the embodiment of FIG. 3 in a covering position relative to the entrance being represented in solid lines and in a non-covering position relative to the entrance being represented in phantom lines.

In addition, the closure element 48 is also maintained, when in its normally covering position as shown in FIG. 4 in solid lines, in an angular orientation due to the pivotal connection of the one end as at 50 and the length of the connector element 56 as shown in FIGS. 3 and 4. The connector element 56 may take a variety of structural configurations and is preferably a monofilament line which is difficult to see.

The retaining means of the present invention is further indicated generally as 58 and includes a slide member 59 and a handle 60 wherein the slide member 58 is selectively movable in accordance with the directional arrows 62 and 63 clearly shown in FIGS. 3 and 4. In FIG. 3, the slide element 59 of the retaining means 58 is shown in solid lines in the retained position relative to the closure element 48 generally and the free end or fingers 54 specifically. The closure element 48 is rotatable about its pivotal connection as at 50 into interruptive or abutting engagement with the roof portion 14 and the slide element is positioned in retaining engagement such that the free end 54 is prevented from normally pivoting, due to gravity, down from the retained position as represented in phantom lines in FIG. 4 wherein the closure element 48 is shown in its covering position in solid lines thereof.

With reference to FIGS. 1 and 2, the operation of the trap assembly is such that the pigeon 42 maintains a head down oriented position when eating the food material 65 scattered (see FIG. 1) through the entrance 40 and into the interior of the storage space 16. The free end 54 defined as spaced apart fingers engage and pass over the shoulder portions 42' of the pigeon 42 thereby causing its displacement from a covering to a non-covering position due to the movement or passage of the bird 42 as he walks through the entrance 40 eating the food material 65 and passing into the storage area 16. The orientation of the bird in a substantially head down position enables the fingers 54 to pass on opposite sides of the head 43 of the bird 42 over the shoulders 42' until the bird 42 is into the storage space. At this locale, the closure element 48 disengages from the bird and normally falls, due to gravity, into the covering position relative to the entrance 40.

Now that the invention has been described,
What is claimed is:

1. A bird trap assembly designed to capture and concurrently retain a plurality of birds without the harming thereof, said assembly comprising:
   (a) a housing including a roof portion and a wall portion connected to one another and collectively surrounding and at least partially defining a storage space for captured birds,
   (b) said wall portion comprising a plurality of side walls disposed in laterally surrounding relation to said storage space,
   (c) said roof portion secured to an upper peripheral portion of said plurality of side walls and disposed in overlying relation to said storage space and defining an upper boundary thereof,
   (d) support means for engaging and supporting said housing on a supporting surface and comprising a flange secured to and extending substantially continuously along the length of a major portion of a lower periphery of said wall portion, said flange further extending into said storage space a distance sufficient to allow a bird to stand thereon,
   (e) an entrance formed in one of said plurality of walls and dimensioned to allow a bird to walk therethrough,
   (f) closure means movably mounted adjacent said entrance for allowing and preventing, respectively, passage of a bird into and out of said storage space,
   (g) said closure means comprising a closure element movably connected to said housing in normally covering relation to said entrance, and
   (h) said closure element configured and disposed to engage a bird and move therewith from a covering to a non-covering position as the bird passes into said storage space.

2. An assembly as in claim 1 wherein said wall portion and said roof portion are formed from an open mesh material defined at least in part by an apertured construction.

3. An assembly as in claim 2 wherein said apertured construction comprise a plurality of apertures disposed in immediately adjacent relation to one another and being of a size sufficient to prevent a bird having a size of an average adult pigeon from passing therethrough.

4. An assembly as in claim 2 wherein said open mesh material comprises a wire material having an apertured construction defined by a plurality of apertures each having an average dimension of two inches by three inches.

5. An assembly as in claim 1 wherein said flange comprises a substantially uniform transverse dimension along its length.

6. An assembly in claim 1 wherein said housing further comprises a substantially open flooring surrounded by said support means and disposed and configured to have a major portion of said storage space overlying and communicating with the support surface on which said housing is positioned.

7. An assembly as in claim 1 wherein said closure element is pivotally mounted to said housing adjacent said entrance, said closure element pivotal between said covering and said non-covering position relative to said entrance.

8. An assembly as in claim 7 further comprising said closure element comprising a free end disposed in spaced relation to the support surface on which said housing is mounted, said free end comprising a plurality of spaced apart fingers disposed and configured to allow contact with and passage thereof over the shoulders of a bird passing through said entrance into said storage space, said closure element pivotal into an at least partially non-covering position as it moves with the bird engaging said closure element.

9. An assembly as in claim 8 wherein said fingers are angularly oriented to extend inwardly into said storage space substantially outwardly from said closure element and into interruptive disposition to any bird attempting to exit said storage space through said entrance.

10. An assembly as in claim 9 wherein said closure element is disposed at an angular orientation relative to said wall portion in which it is formed when said closure element is in said covering position relative to said entrance 11. An assembly as in claim 10 further comprising retaining means mounted on said housing and disposable between a retaining and non-retaining position for maintaining and releasing said closure element into and out of said covering position relative to said entrance.

12. An assembly as in claim 11 wherein said retaining means comprises a slide element movably secured to said roof portion in overlying relation to said closure element and selectively positionable into retaining engagement with said closure element when said closure element is disposed in said non-covering position relative to said entrance, said retaining means disposed and structured for retaining engagement and maintenance of said cover element in said non-covering position.

13. An assembly as in claim 11 wherein said retaining means further comprises a connecting element connected both to said roof portion and said closure element in interconnecting relation therebetween and dimensioned and configured to maintain said free end of said closure element in spaced relation to a supporting surface on which said housing is mounted.

14. A bird trap assembly designed to capture and concurrently retain a plurality of birds without the harming thereof, said assembly comprising:

(a) a housing including a roof portion and a wall portion connected to one another and collectively surrounding and at least partially defining a storage space for captured birds, (b) said wall portion comprising a plurality of side walls disposed in laterally surrounding relation to said storage space, (c) said roof portion secured to an upper peripheral portion of said plurality of side walls and disposed in overlying relation to said storage space and defining an upper boundary thereof, (d) support means comprising an elongated flange secured to a lower periphery of said wall portion and extending along a major portion of its length, said flange extending inwardly into said storage space from said wall portion a distance sufficient to allow a bird to stand thereon, said flange having opposite free end portions each terminating at an entrance formed in one of said plurality of walls and dimensioned to allow a bird to walk therethrough, said flange having said opposite free end portions thereof being disposed in spaced relation to one another on opposite sides of said entrance, (e) said housing further comprising a substantially open flooring surrounded by said support means and disposed and configured to have a major portion of said storage space overlying and communicating with the support surface on which said housing is positioned, (f) said housing comprising said open flooring portion exposed directly to the supporting surface and directly communicating with said open flooring of said storage space and housing:

(g) closure means movably mounted adjacent said entrance for allowing and preventing, respectively, passage of a bird into and out of said storage space, (h) said closure means comprising a closure element movably connected to said housing in normally covering relation to said entrance, and (i) said closure element configured and disposed to engage a bird and move therewith from a covering to a non-covering position as the bird passes into said storage space.

* * * * *